(12) United States Patent
Mishra et al.

(10) Patent No.: US 8,824,335 B2
(45) Date of Patent: *Sep. 2, 2014

(54) ENDPOINT-TO-ENDPOINT COMMUNICATIONS STATUS MONITORING

(75) Inventors: Rajeev Mishra, Bangalore (IN); Lance W. Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/425,649

(22) Filed: Mar. 21, 2012

(65) Prior Publication Data

US 2012/0203897 A1 Aug. 9, 2012

Related U.S. Application Data

(63) Continuation of application No. 12/959,556, filed on Dec. 3, 2010, now Pat. No. 8,634,328.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......... 370/254; 370/241; 370/242; 370/243; 370/244; 370/245; 370/246; 370/247; 370/248; 370/249; 370/250; 370/251; 370/252; 370/253; 370/255; 370/256; 370/257

(58) Field of Classification Search
None
See application file for complete search history.

(56) References Cited

U.S. PATENT DOCUMENTS

| 6,031,817 | A | 2/2000 | Moy |
| 6,185,613 | B1 | 2/2001 | Lawson et al. |
| 6,411,967 | B1 | 6/2002 | Van Renesse |
| 6,591,317 | B1 | 7/2003 | Schzukin et al. |
| 6,778,504 | B2 | 8/2004 | Santry et al. |

(Continued)

FOREIGN PATENT DOCUMENTS

WO WO2004031979 A2 4/2004

OTHER PUBLICATIONS

Office Action in U.S. Appl. No. 12/959,556 mailed on Mar. 5, 2013, 16 pages. (pp. 1-16 in pdf).

(Continued)

*Primary Examiner* — Hassan Phillips
*Assistant Examiner* — Lonnie Sweet
(74) *Attorney, Agent, or Firm* — Mitch Harris, Atty at Law, LLC; Andrew M. Harris; Matthew W. Baca

(57) ABSTRACT

Communication ability between nodes in a cluster-based computer system is tracked to inform applications executing on the nodes of the existence and quality of the endpoint-to-endpoint communications available between the nodes. Communications between a node and other nodes are tracked, and a database records the communication ability between the node and the other nodes for each link between the nodes. The tracking and recording are repeated at the other nodes. A registration by an application executing at a particular one of the nodes to receive notifications of changes in the communication ability with another node over a particular link (or in general) will cause notification of the application when the link status changes.

7 Claims, 4 Drawing Sheets

(56) References Cited

U.S. PATENT DOCUMENTS

| | | | |
|---|---|---|---|
| 6,862,619 B1 | 3/2005 | Sugauchi et al. |
| 6,983,324 B1 | 1/2006 | Block et al. |
| 7,058,957 B1 | 6/2006 | Nguyen |
| 7,451,359 B1 | 11/2008 | Coekaerts |
| 7,539,755 B2 | 5/2009 | Li et al. |
| 7,542,437 B1 | 6/2009 | Redi et al. |
| 7,571,230 B2 | 8/2009 | Gissel et al. |
| 7,590,898 B2 | 9/2009 | Coekaerts |
| 7,624,194 B2 | 11/2009 | Kakivaya et al. |
| 7,664,125 B1 | 2/2010 | Bauer et al. |
| 7,738,364 B2 | 6/2010 | Bain |
| 7,856,480 B2 | 12/2010 | Muchow |
| 8,108,715 B1 | 1/2012 | Agarwal |
| 8,161,053 B1 | 4/2012 | Khan et al. |
| 8,384,549 B2 | 2/2013 | Lemmon |
| 8,433,760 B2 | 4/2013 | Ganapathy et al. |
| 2002/0178275 A1 | 11/2002 | Hein et al. |
| 2003/0061340 A1 | 3/2003 | Sun et al. |
| 2003/0088831 A1 | 5/2003 | Bauer et al. |
| 2003/0093516 A1 | 5/2003 | Parsons et al. |
| 2003/0105801 A1 | 6/2003 | Tse et al. |
| 2003/0105850 A1 | 6/2003 | Lean et al. |
| 2003/0225840 A1 | 12/2003 | Glassco et al. |
| 2003/0233594 A1 | 12/2003 | Earl |
| 2004/0008727 A1 | 1/2004 | See et al. |
| 2004/0030775 A1 | 2/2004 | Lauzon et al. |
| 2004/0064835 A1 | 4/2004 | Bellwood et al. |
| 2004/0172467 A1 | 9/2004 | Wechter et al. |
| 2005/0065953 A1 | 3/2005 | Bower et al. |
| 2005/0076145 A1 | 4/2005 | Ben-Zvi et al. |
| 2005/0152396 A1 | 7/2005 | Pichna et al. |
| 2005/0234929 A1 | 10/2005 | Ionescu et al. |
| 2006/0031282 A1 | 2/2006 | Tuttle et al. |
| 2006/0050629 A1 | 3/2006 | Saika |
| 2007/0041328 A1* | 2/2007 | Bell ............................ 370/248 |
| 2007/0140243 A1 | 6/2007 | Eastham |
| 2007/0226182 A1 | 9/2007 | Sobotka et al. |
| 2008/0077635 A1 | 3/2008 | Sporny et al. |
| 2008/0183857 A1 | 7/2008 | Barfield et al. |
| 2008/0317050 A1 | 12/2008 | Xiong et al. |
| 2009/0043887 A1 | 2/2009 | Coekaerts |
| 2009/0070617 A1 | 3/2009 | Arimilli |
| 2009/0138808 A1 | 5/2009 | Moromisato et al. |
| 2009/0199051 A1 | 8/2009 | Jann et al. |
| 2010/0115338 A1 | 5/2010 | Rao et al. |
| 2010/0223492 A1 | 9/2010 | Farrugia et al. |
| 2010/0281304 A1 | 11/2010 | Moyer et al. |
| 2010/0290469 A1 | 11/2010 | Assarpour |
| 2010/0332277 A1 | 12/2010 | Dentzer et al. |
| 2011/0093743 A1 | 4/2011 | Arcese et al. |
| 2011/0202500 A1 | 8/2011 | Warn et al. |
| 2011/0274053 A1 | 11/2011 | Baik et al. |
| 2012/0047257 A1 | 2/2012 | Hauser |
| 2012/0140675 A1* | 6/2012 | Mishra et al. ................. 370/254 |
| 2012/0144018 A1 | 6/2012 | Fried et al. |
| 2012/0203897 A1 | 8/2012 | Mishra et al. |
| 2012/0203899 A1 | 8/2012 | Ganapathy et al. |

OTHER PUBLICATIONS

Van Renesse, et al., "A gossip-style failure detection service", Proceedings of the IFIP International Conference on Distributed Systems Platforms and Open Distributed Processing, 2009, Springer Verlag, Illinois.

Notice of Allowance in U.S. Appl. No. 12/959,556 mailed on Sep. 11, 2013, 11 pages (pp. 1-11 in pdf).

* cited by examiner

US 8,824,335 B2

ENDPOINT-TO-ENDPOINT COMMUNICATIONS STATUS MONITORING

The present Application is a Continuation of U.S. patent application Ser. No. 12/959,556, filed on Dec. 3, 2010 now U.S. Pat. No. 8,634,328 and claims priority thereto under 35 U.S.C. §120. The disclosure of the above-referenced parent U.S. Patent Application is incorporated herein by reference.

CROSS-REFERENCE TO RELATED APPLICATIONS

The present U.S. Patent Application is related to co-pending U.S. patent applications Ser. No. 12/959,568 entitled "DYNAMIC RATE HEARTBEATING FOR INTER-NODE STATUS UPDATING Ser. No. 12/959,581 entitled "INTER-NODE COMMUNICATION SCHEME FOR NODE STATUS SHARING" filed contemporaneously herewith and having at least one common inventor and assigned to the same Assignee, the disclosures of which are incorporated herein by reference.

BACKGROUND

1. Field of the Invention

The present invention is related to communications in distributed computing systems, and more specifically to endpoint-to-endpoint monitoring of communication status in node-based computing schemes.

2. Description of Related Art

In large-scale distributed computer systems, such as those using distributed software models to perform tasks, multiple nodes provide independent execution of sub-tasks. In order to keep such a system operational, and further, to provide for proper operation of distributed applications that use the multiple nodes to perform various tasks, the ability to communicate with other nodes is tracked. In particular, the operation status of hardware interfaces that connect the nodes is monitored and used to determine whether other nodes in the system can be communicated with. Further node status is monitored to ensure that nodes that are to be used to perform tasks are operational.

Communications and status monitoring is typically centralized, with a monitoring application providing information about node and interface status. The monitoring application may use distributed agents to perform the monitoring on each node.

BRIEF SUMMARY

The invention provides a communications monitoring system that is embodied in a computer-performed method that provides information about endpoint-to-endpoint communications ability within a node-based distributed processing system.

Communication status among a cluster of nodes of a computer system is determined by tracking communications received from other nodes within the cluster of nodes at a node, recording a result of the tracking to provide a database of communication ability between the node and the other nodes and then repeating the tracking and recording at the other nodes in the cluster of nodes. An application registered to receive status changes in a communications link to another node of interest is notified when the ability of the application to communicate over the link changes, along with information about the status of the link.

The method may further generate traffic between the nodes in order to increase the traffic available for the tracking, and the method may track only generated traffic, or a combination of ordinary and generated traffic. The information provided to the application may include the particular hardware interface of the link, the type of the hardware interface, and an indication of the time at which the last transmission from the other node was received.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for monitoring communication status in clusters of nodes within distributed computing systems. In particular, embodiments of the invention provide for maintaining a database, such as a table, of links between nodes in a cluster and a status of the links. Applications can register for notification of when the status of a link changes, which can occur due to loss of configuration or routing information for the link, a process deadlocking on a node, a hardware failure, or another cause that prevents communications resources between the nodes from being accessible. Information about the status change is also provided to the application, either by polling or as part of the event notification message. The information may include the last time since a packet was received over a link, the hardware interface of the link, the address and port number (or other network specifier) of the remote endpoint, the sequence number of the last packet received, and/or other useful information about the link status. Traffic may be generated to ensure that continual communications are available for the tracking, so that a link is not marked as down when the lack of communications is merely due to a lack of particular traffic from the link during a given time interval. The tracking may track only generated traffic, only regular traffic, or all traffic across the links.

Figure 1:
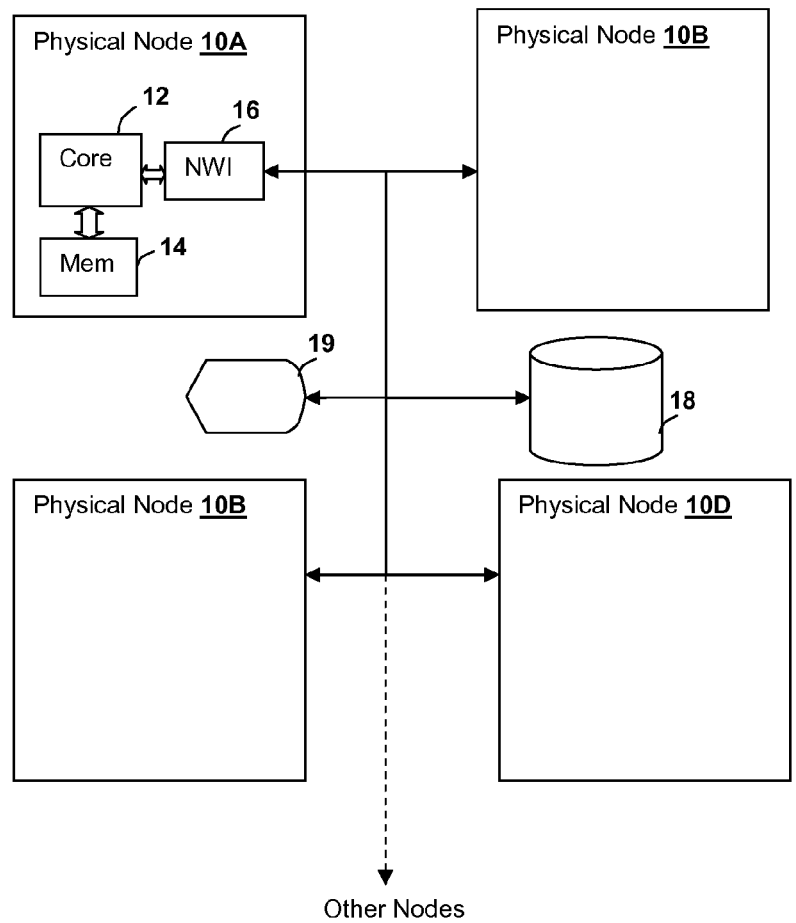
FIG. 1 is a block diagram of a distributed computer system in which techniques according to an embodiment of the present invention are practiced.

Referring now to FIG. 1, a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide node status information from tracking of communications between either physical processing nodes 10A-10D, virtual processing nodes partitioned within the depicted computer system as will be described in further detail below, or both. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-10D are illustrated, a distributed computer system in accordance with an embodiment of the present invention will generally include a large number of compute nodes connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
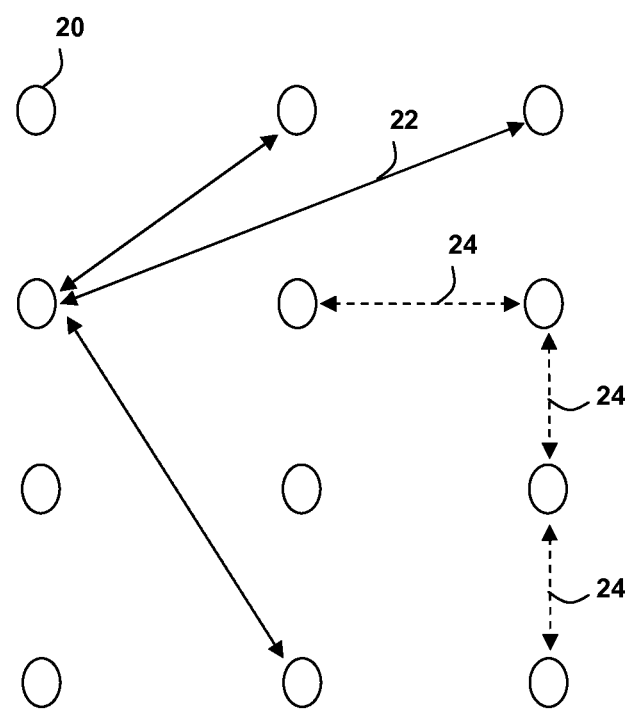
FIG. 2 is a pictorial diagram depicting communication between nodes of a computer system in accordance with an embodiment of the present invention.

Referring now to FIG. 2, communication between multiple nodes 20 of the distributed computer system of FIG. 1 is shown. As mentioned above, nodes 20 may correspond exactly on a one-to-one basis with processing nodes 10A-10D (and other nodes) of FIG. 1, or nodes 20 may be partitioned in a different manner as virtual processing nodes. For example, a single node 20 may have exclusive use of multiple processing nodes, e.g. nodes 10A-10B, and result in a system having a greater number of virtual nodes than processing nodes, or alternatively, multiple nodes 20 may be implemented on a single processing node, e.g., node 10A. In the present invention, each of nodes 20 represents at least one operating system image and one or more applications executing within the operating system image. In general, the entire system as depicted may execute a single application, but sub-tasks within the application are apportioned to the various nodes 20, which may be identical sub-tasks or different sub-tasks. The present invention concerns node communications monitoring and tracking of link status for links between nodes within the computer system of FIG. 1, messages are communicated between nodes 20 and the receipt of the messages is observed and recorded at each node. Operational messages are passed between nodes 20, including data and program code transmissions, and messages as needed to support features of particular embodiments of the present invention, such as communication of node status to other nodes. The messaging also may include push traffic in general that is used to ensure that node health and communication status is continually monitored. Nodes are generally arranged in a cluster, which is a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 20 pass along messages to other nodes 20. Another alternative is to use a central facility for inter-node communication. However, since the illustrated embodiment provides a de-centralized communications monitoring system, it is generally preferable not to use a central exchange for messaging.

Figure 3:
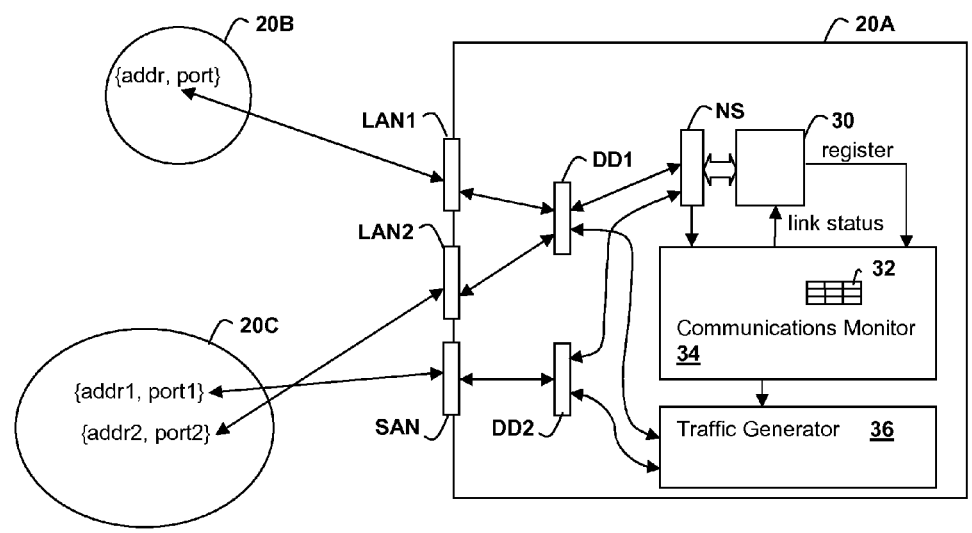
FIG. 3 is a block diagram depicting a communications monitoring architecture in a computer system in accordance with an embodiment of the present invention.

Referring now to FIG. 3, a communications monitoring architecture in accordance with an embodiment of the invention is shown. An application 30 within a processing node 20A communicates with other processing nodes 20B and 20C via a software and hardware network stack and channel arrangement that include: an operating system network stack NS, interface device drivers DD1 and DD2 and physical interfaces managed by device drivers DD1 and DD2, including local area networks LAN1 and LAN2, as well as storage area network SAN. Application 30 communicates with other applications in nodes 20B and 20C via routed links using address port pairs in the illustrative example. A communications monitor 34 receives communications logging information from network stack NS and maintains a database in the form of a table 32, that records the information illustrated below in exemplary Table I, which provides an example of a database in accordance with an embodiment of the invention that may be used as a structure for table 32.

TABLE I

| Remote Node | Physical Interface | Interface Type | Link address: port | Status | Timestamp | Seq # | Mean ΔT | Var ΔT |
|---|---|---|---|---|---|---|---|---|
| 3 | 0 | LAN | addr, port | UP | 0100345 ms | 2304 | 3.2 ms | 1 ms |
| 2 | 1 | LAN | addr2, port2 | UP | 0101288 ms | 789 | 2.1 ms | 0.7 ms |
| 2 | 0 | SAN | addr1, port1 | DOWN | 0325478 ms | 242 | 10 ms | 2 ms |

The link to Remote Node is uniquely identified the Physical Interface number, and the Link address: port number. The interface type is supplied so that application can select suitable links and/or identify an expected link from the table by its type. Information about the quality and status of the link are provided in the form of the elapsed time since the last packet, the sequence number of the last packet, the mean time between transmissions and the variance of the time between transmissions. The link status, which is either up or down, is determined by communications monitor 34, which notifies application 30 if the UP/DOWN status changes if application 30 has registered to receive communication status events for the particular interface having a status change. Other nodes 20B and 20C contain their own instances of a communications monitor and other features as depicted in node 20A, that provide notification to local applications executing within nodes 20B and 20C.

In the depicted embodiment, the communications monitored to populate table 32 are all of the communications passing through network stack NS for the listed communications links. The communications may be ordinary communications passing data and messages in performance of the tasks executed by nodes 20A-20C and other nodes, or extra communications generated by a traffic generator 36 that ensures that enough communications are passing between node 20A and all of the other nodes, so that each other node receives regular communications. Communications traffic at the node may be observed and used to adjust the rate at which transmissions are generated by traffic generator 36. Details of such a technique are disclosed in above-incorporated U.S. Patent Application "DYNAMIC RATE HEARTBEATING FOR INTER-NODE STATUS UPDATING", in which statistics of overall communications frequency from the nodes in the cluster are used to adapt the heartbeat rate at which the traffic is generated. Further, the statistics can also be used to adjust the threshold values used to determine link up/link down status, which represent the permissible elapsed time since the last packet was received before the link is considered "down." Similarly, the link status "up" threshold can also be adjusted based on the determined communications frequency statistics. Further, the status of other nodes in the system, which may be used to further set a "down" status of the links to nodes reported as "down", may be reported in the generated traffic. For example, traffic generator 36 may generate traffic that reports information stored in table 32 to other nodes. Additionally, communications monitor 34 may maintain a separate table containing status of all other nodes for which information is received from the generated traffic. Details of such a gossiping scheme are disclosed in above-incorporated U.S. Patent Application "INTER-NODE COMMUNICATION SCHEME FOR NODE STATUS SHARING."

Figure 4:
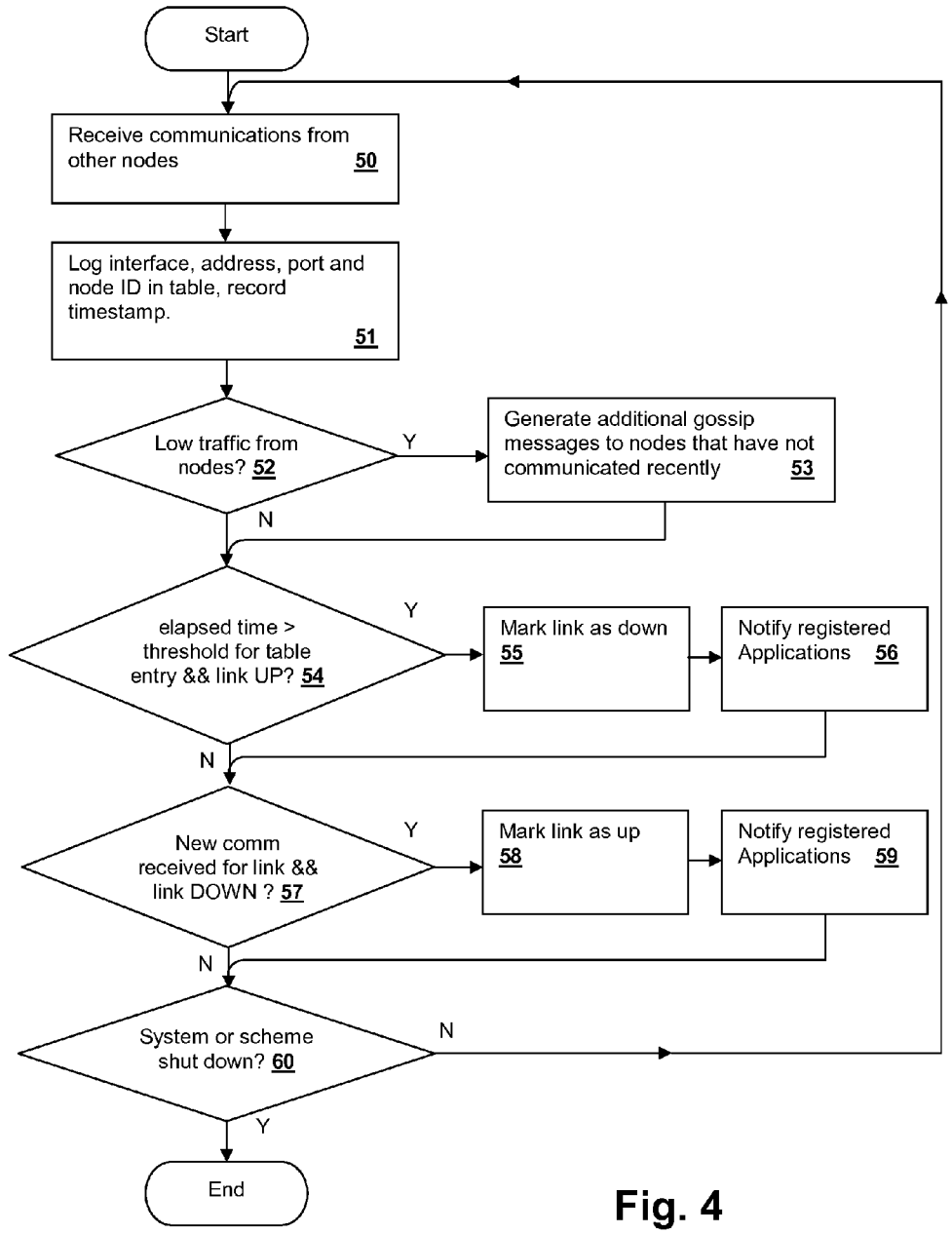
FIG. 4 is a flowchart of a method in accordance with an embodiment of the present invention.

Referring now to FIG. 4, a node communications monitoring method in accordance with an embodiment of the present invention is illustrated. The method receives communications from other nodes (step 50) and the interface, address, port and node ID are logged in table 32, and the timestamp entry is updated (step 51). If traffic from other nodes is low (decision 52) additional gossip messages may be generated to nodes that have not communicated recently (step 53) or the traffic may be increased in general. If the elapsed time between transmissions for an entry exceeds a threshold and the link status is UP (decision 54) then the link is marked as DOWN (step 55) and applications monitoring the link are notified (step 56). If a new communication is received for a link and the link status is DOWN (decision 57) then the link is marked as UP (step 58) and applications monitoring the link are notified (step 59). Until the system is shut down or the scheme is terminated (decision 60), the process of steps 50-59 is repeated.

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for determining communication status among a cluster of nodes of a computer system, the method comprising:

at a node within the cluster of nodes, tracking communications received from other nodes within the cluster of nodes;

recording a result of the tracking to provide a database of communication ability between the node and the other nodes;

repeating the tracking and recording at the other nodes in the cluster of nodes to generate additional databases of communication ability at corresponding ones of the other nodes that track the ability of the corresponding node to communicate with remaining nodes in the cluster;

at a particular one of the nodes, receiving a registration request from an application executing at the particular one of the nodes to receive information indicative of the ability of the application to communicate with another specified node within the cluster of nodes; and responsive to receiving the registration request, subsequently providing notifications to the application if the ability to communicate with the another specified node changes, wherein the notifications contain information indicative of the ability of the application to communicate with the another specified node.

2. The method of claim 1, wherein the tracking tracks ordinary communications among the cluster of nodes.

3. The method of claim 2, further comprising generating traffic among the cluster of nodes in order to increase the amount of information available to the tracking, and wherein the tracking tracks both the generated traffic and the ordinary communications.

4. The method of claim 1, further comprising generating traffic among the cluster of nodes in order to increase the amount of information available to the tracking, and wherein the tracking tracks only the generated traffic.

5. The method of claim 1, wherein the recording further records an indication of one or more hardware interfaces over which the tracked communications occur, and wherein the providing further provides the indication of the one or more hardware interfaces to the application as part of the information indicative of the ability of the application to communicate with the another specified node.

6. The method of claim 5, wherein the recording further records a type of the hardware interfaces over which the tracked communications occur, and wherein the notifying further provides the type of the one or more hardware interfaces to the application as part of the information indicative of the ability of the application to communicate with the another specified node.

7. The method of claim 1, wherein the recording further records an indication of time at which the tracked communications last occurred for the corresponding other nodes, and wherein the notifying further provides the indication of the time that the tracked communication last occurred with the another specified node as part of the information indicative of the ability of the application to communicate with the another specified node.

* * * * *